Sept. 9, 1947.  S. H. FRANKEL  2,427,206
PEDESTAL AND BASE CONNECTOR STRUCTURE THEREFOR
Filed July 12, 1945  2 Sheets-Sheet 1

*INVENTOR:*
Samuel H. Frankel
BY
R. J. Schwarz
*ATTORNEY.*

Sept. 9, 1947.   S. H. FRANKEL   2,427,206
PEDESTAL AND BASE CONNECTOR STRUCTURE THEREFOR
Filed July 12, 1945   2 Sheets-Sheet 2

INVENTOR:
Samuel H. Frankel
BY
R. J. Schwarz
ATTORNEY

Patented Sept. 9, 1947

2,427,206

UNITED STATES PATENT OFFICE 2,427,206

PEDESTAL AND BASE CONNECTOR STRUCTURE THEREFOR

Samuel H. Frankel, Chicago, Ill., assignor, by mesne assignments, to Helene Curtis Industries, Inc., a corporation of Illinois Application July 12, 1945, Serial No. 604,561

8 Claims. (Cl. 248—194)

This invention relates to improvements in pedestals of the kind wherein a vertical standard is supported upon a base comprising demountable buttress type legs and is adapted to carry a portable hair drier or the like, and more especially concerns features involving the structure by which the legs and standard are connected together.

One of the principal deficiencies in at least certain prior pedestal constructions which include bases comprising demountable buttress-type legs has resided in a looseness between the leg structure and the pedestal, and more especially between the buttress arms of the legs and the pedestal, wherefore rattling and noisiness often result from operating vibrations, or other relative motions of the base and pedestal such as may occur during movement of the unit about or over an uneven floor.

An important object of the present invention is to provide an improved buttress arm connection for the legs of a hair drier pedestal base or the like wherein the standard or pedestal is engaged in a rattle-proof manner.

Another object of the invention is to provide a cushioned connection between the legs and the standard of a pedestal unit.

A further object is to provide a novel self-centering relationship of the standard and the buttress arms of the pedestal base legs.

Other objects, features, and advantages of the invention will become apparent from the following description of certain exemplary embodiments of the invention taken in connection with the accompanying two sheets of drawings, in which.

Figure 1:
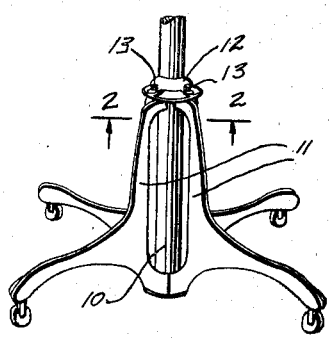
Fig. 1 is a perspective view on a reduced scale of the base portion of a pedestal unit embodying the features of the invention.
Figure 2:
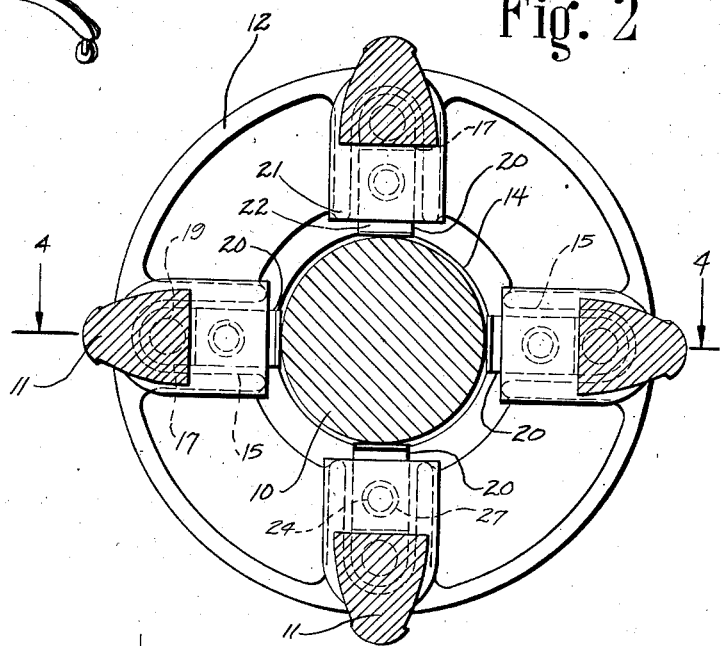
Fig. 2 is an enlarged horizontal sectional detail view through the base of the pedestal unit taken substantially in the plane of line 2—2 of Fig. 1.
Figure 4:
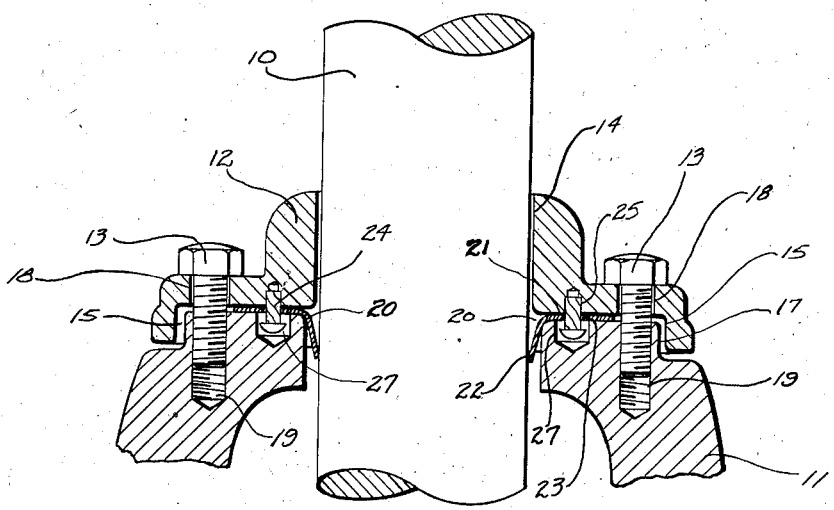
Fig. 4 is a vertical sectional detail view taken along line 4—4 of Fig. 2.

As shown in Fig. 1, the base portion of a pedestal unit embodying the features of my invention comprises a vertical post or standard 10 which forms all or part of a pedestal upright supporting such means as a hair drier head (not shown), and is itself supported by a plurality of buttress-type legs 11. Instead of having the upper or buttress ends of the legs 11 secured directly to the standard 10, a connector member 12 is detachably secured to the legs by means such as screws 13. As best seen in Figs. 2 and 4, the connector 12 is preferably in the form of a flange plate or disk concentrically surrounding the standard 10 in slightly spaced relation by having an axial standard-clearing aperture 14 which is of slightly larger diameter than the outside diameter of the standard so that the connector and standard can be readily relatively axially moved for assembly or disassembly purposes. A uniformly interlocked relationship of the connector plate 12 and the legs 11 is attained by having the plate formed with identical equidistantly spaced elongated under-face sockets 15 extending radially from the center aperture 14. Within the sockets are received upwardly extending interengaging bosses 17 formed upon the upper or buttress ends of the respective legs 11. A screw hole 18 opening vertically into each of the sockets 15 registers with a tapped screw hole 19 extending down through each of the associated bosses 17 to receive the respective screws 13 by which the connector and legs are secured together. This construction affords a strong, compact and simple arrangement whereby the legs 11 can be quickly assembled or disassembled.

According to the present invention, a novel self-centering rattle-proof connection is afforded between the post 10 and the connector 12. To this end, I provide cushioning means, in the present instance comprising in one simple and highly practical form a leaf spring member 20 associated with each of the leg-receiving sockets 15. The mounting of the centering and cushioning spring members 20 with respect to the connector member 12 is such that during assembly of the connector member 12 it can be moved freely, and without interference from the spring members 20, along the standard 10, but upon attachment of the connector 12 to the legs 11 the spring members 20 automatically assume predetermined centering and cushioning relationship to the standard, the legs, and the connector.

Figure 3:
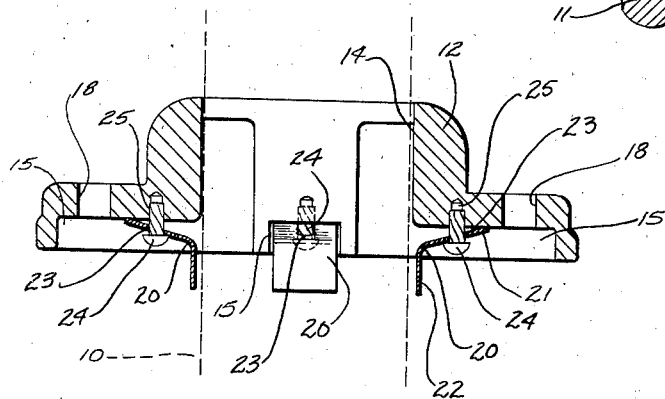
Fig. 3 is a diametrical vertical sectional view through the connector structure of the base showing such structure as seen when out of engagement with the buttress legs of the base.

Each of the spring members 20 is of equal tension and preferably formed from fairly stiff spring metal in substantially dog-leg shape to provide a pair of obtusely angular flat portions 21 and 22. In this instance, the spring portion 21 serves as a base element and is intermediately apertured as at 23 to receive therethrough a slightly smaller diameter drive screw 24 which is anchored in a bore 25 in the roof of the associated socket 15 and spaced from the post hole 14 a distance substantially equal to or only slightly greater than the length of the spring base portion 21 intervening between the drive screw and the remaining or cushioning spring portion 22. By having the drive screw 24 driven only partially into the connector 12, to a distance limited by the depth of the bore 25, the spring member 20 will hang askew, as best seen in Fig. 3, prior to connection to the legs 11 with the spring portion 22 suspended and swung clear of the diameter of the aperture 14. As a result, the connector member 12 can be moved freely longitudinally and rotatably relative to the standard 10 during assembly or disassembly of the parts.

However, when the leg-end bosses 17 are received within the sockets 15 they engage the respective spring base portions 21 and carry such portions flat against the roofs of the sockets. As a result the obtusely angular cushioning portions 22 of the springs are swung toward and into engagement with the contiguous surface of the standard 10. Since the drive screws 24 allow the springs 20 but very limited longitudinal movement, it will be evident that as the connector 12 and the leg bosses 17 are drawn tightly together by the screws 13, and the inner end portions of the bosses drive the respective spring base portions 21 tightly against the roofs of the associated sockets 15 the cushion portions 22 of the springs are forced to bear resiliently with substantial force against the standard 10. Where adequate accuracy in manufacture of the leg end bosses 17 is attainable the shoulders thereof may be relied upon, alone or supplemental to the drive screws 24, to engage in the corners of the springs 20 in assembly (Fig. 4) to effect tensioning or loading of the cushion portions 22.

As a result of the symmetrical arrangement of the cushioning springs 20 about the circumference of the standard 10 so that opposing pairs of the springs impinge against the standard 10 diametrically, and as best seen in Fig. 2 on right angularly related diameters, the standard 10 will be held in centered relation within the aperture 14 of the connector 12. Due to the resiliency of the cushioning portions 22 of the springs, the transmision of shocks or vibration in either direction between the post 10 and the legs 11 is quite effectively resisted and dampened. Yet the strength or stiffness of the springs 20 is such that they effectively resist the lateral thrust of the standard 10 which results from the overbalancing weight of a drier head or the like and tends to close the gap between the standard and the encircling connector 12.

In order to afford clearance for the head end portions of the drive screws 24 when the springs 20 have been driven into their active positions, the bosses 17 are preferably formed with appropriate clearance bores 27 (Fig. 4). Clearance for the cushioning portions 22 of the springs is afforded by having the adjacent ends of the leg bosses 17 cut back or shortened as seen in Figs. 2 and 4.

Figure 5:
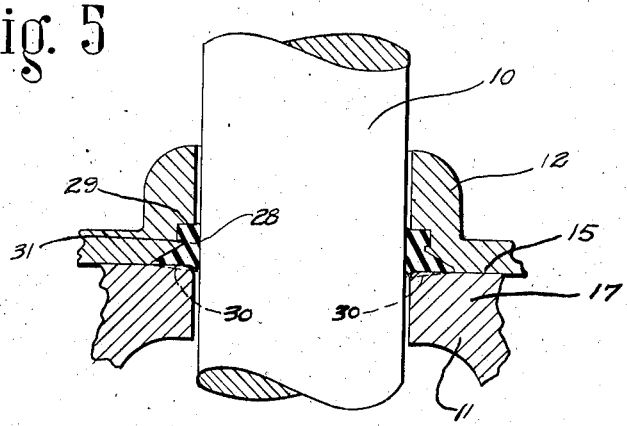
Fig. 5 is a fragmentary vertical sectional view through the connector structure of a similar pedestal base showing a modified form of the invention.

In the modified form of the invention shown in Fig. 5, cushions 28 of yieldable non-metallic material such as rubber, either natural or synthetic, leather, or the like may be provided on the connector 12 in such a manner that upon securing the respective bosses 17 in the sockets 15 the bosses drive against the cushions, the material of which is deformed to press tightly against standard 10 and thus accomplish substantially the same centering and cushioning functions as the aforementioned metal springs 20. The cushions 28 may be either in the form of individual inserts or may be formed as parts of a continuous gasket, in either event adapted to be received within a seat 29 provided therefor within the inner lower corner portion of the connector 12 at the standard-clearing aperture 14. Within the seat 29, the resilient cushions 28 are confined against yielding in any transverse direction except toward the standard 10 when the bosses 17 are forced against normally downwardly projecting fullness in the cushions, indicated in broken outline at 30, and which in the final assembly is pressed into the cushioned body which is thus compelled to expand toward the standard 10. The result is a tight, yieldable cushioning grip holding the standard 10 centered and preventing the transmisison of vibrations or shocks between the standard 10 and the legs 11. However, before the legs are connected during assembly, and also when the legs are demounted, the material of the cushions 28 returns to the underformed condition 30, wherein it clears the standard 10 for free movement of the connector relative to the standard.

In order to assist in maintaining a preassembled relationship of the cushions 28 within the seat 29, means such as a retaining rib or ribs 31 may be provided to interengage with the cushioning means.

While I have illustrated and described certain preferred embodiments of my invention, it is to be understood that I do not thereby intend to limit my invention to the specific forms disclosed, but contemplate that various modifications, substitutions and alternative constructions may be effected without departing from the spirit and scope of the invention as defined in the appended claims.

I claim:

1. In combination in a pedestal construction of the character described including a standard and a plurality of detachable legs, a connector adapted to encircle the standard in spaced relation and secure the legs in a unit about the post, and cushioning means comprising a plurality of metallic springs carried by the connector and normally tending to remain inactive but being engageable with the standard as an incident to securing the connector to the legs and functioning to maintain a substantially vibration and shock free relationship between the standard on one hand and the connector and legs on the other hand.

2. In combination in a connector of the character described, a plate having an aperture therein adapted to receive a standard therethrough in spaced relation, and a plurality of leaf springs carried by said plate normally clearing said aperture for freedom of relative movement of the plate and standard but adapted to be forced into cushioning engagement with the standard when the plate is secured to a plurality of legs each cooperating with one of said springs for supporting the standard vertically.

3. In combination in a pedestal structure of the character described, a plurality of demountable legs, a pedestal centrally located with respect to the legs, a connector plate engageable with the legs and having a central opening for receiving the pedestal in spaced relation, and a plurality of substantially dog-legged leaf springs respectively adapted to be engaged by the pedestal legs and having one arm in each instance movably secured to the connector in the region thereof engaged by an associated pedestal leg and a free tensioning leg constructed and arranged to be forced into tensioned engagement with the post as an incident to securing the associated pedestal leg and the connector together.

4. A structure as defined in claim 3 in which the base arm of each of the springs has an aperture and a headed securing pin having a shank of smaller diameter extends through such aperture and connects the base leg loosely to the connector in such a manner that in the disassembled condition of the connector and pedestal legs the springs hang clear of the pedestal for free movement of the connector concentrically relative to the pedestal.

5. In combination in a pedestal structure of the character described, an annular connector plate having a plurality of downwardly opening radially extending sockets and a central pedestal hole into which the sockets open, a pedestal received in said hole in spaced relation to the walls thereof, a plurality of demountable legs having bosses projecting into the respective sockets, individual screw means associated with each leg for securing said leg to said connector, and deformable means carried by said connector and arranged when said screw means are tightened to be forced by the connector engaged portions of the legs into resilient engagement with said pedestal.

6. A combination as defined in claim 5 in which the cushioning means comprises a gasket of rubber-like material.

7. In a pedestal base construction, a plurality of demountable buttress type legs adapted to be mounted centrally about a pedestal, a connector comprising a member having a central opening dimensioned to receive the pedestal in spaced relation and engageable with the upper ends of the buttress legs, means for detachably securing said connector to the legs, and cushioning means comprising a plurality of metallic springs carried by the connector and normally tending to remain inactive, said springs being engageable by the legs and forced into cushioning engagement with the pedestal.

8. In combination in a pedestal structure of the character described, an annular connector plate having a plurality of downwardly opening radially extending sockets and a central pedestal hole into which the sockets open, a pedestal received in said hole in spaced relation to the walls thereof, a plurality of demountable legs having bosses projecting into the respective sockets, individual screw means associated with each leg for securing said leg to said connector, and cushioning means comprising a plurality of metallic springs carried by the connector and normally tending to remain inactive, said springs being engageable by the legs and forced into cushioning engagement with the pedestal.

SAMUEL H. FRANKEL.

REFERENCES CITED

The following references are of record in the file of this patent:

UNITED STATES PATENTS

| Number | Name | Date |
|---|---|---|
| 471,184 | Milner | Mar. 22, 1892 |
| 218,443 | Bullock | Sept. 9, 1879 |
| 2,210,047 | Stieglitz | Aug. 6, 1940 |
| 414,214 | Harsha | Nov. 5, 1889 |
| 818,005 | Turner et al. | Apr. 17, 1906 |

FOREIGN PATENTS

| Number | Country | Date |
|---|---|---|
| 418,519 | Great Britain | Oct. 26, 1934 |